United States Patent
Spragle et al.

(10) Patent No.: US 7,447,645 B2
(45) Date of Patent: Nov. 4, 2008

(54) METHOD AND SYSTEM FOR CALL SCREENING

(75) Inventors: Tom Spragle, Leesburg, VA (US);
Sergio Nirenberg, Springfield, VA (US);
Norris M. Hall, Mount Airy, MD (US);
Guillermo Bodnar, South Riding, VA (US)

(73) Assignee: Arbinet-theexchange, Inc., New Brunswick, NY (US)

( * ) Notice: Subject to any disclaimer, the term of this patent is extended or adjusted under 35 U.S.C. 154(b) by 1182 days.

(21) Appl. No.: 10/638,456

(22) Filed: Aug. 11, 2003

(65) Prior Publication Data

US 2004/0172265 A1 Sep. 2, 2004

Related U.S. Application Data

(60) Provisional application No. 60/450,964, filed on Feb. 28, 2003.

(51) Int. Cl.
*G06F 9/44* (2006.01)

(52) U.S. Cl. .................. 705/7; 705/26; 705/37; 379/219; 379/220.01; 379/221.09; 379/221.1

(58) Field of Classification Search ............ 705/7, 705/26, 37; 379/219, 220.01, 221.1, 221.09
See application file for complete search history.

(56) References Cited

U.S. PATENT DOCUMENTS

| | | | |
|---|---|---|---|
| 5,450,482 A * | 9/1995 | Chen et al. | 379/230 |
| 5,719,930 A * | 2/1998 | MacDonald et al. | 379/229 |
| 7,257,217 B1 * | 8/2007 | Lee | 379/265.01 |

* cited by examiner

*Primary Examiner*—Quynh H Nguyen
(74) *Attorney, Agent, or Firm*—Cohen Pontani Lieberman & Pavane LLP

(57) ABSTRACT

A method and system for optimizing telecommunications network resources using a feedback control system. In particular, a call screening device is used in conjunction with a signal switching point to accept or reject incoming phone calls based on far-end capacities of terminating carriers or invalid calling codes in the calling numbers as indicated by signaling messages from terminating carriers.

24 Claims, 3 Drawing Sheets

METHOD AND SYSTEM FOR CALL SCREENING

RELATED APPLICATIONS

This application claims priority from U.S. Provisional Patent Application Ser. No. 60/450,964, which was filed on Feb. 28, 2003.

BACKGROUND OF THE INVENTION

1. Field of the Invention

The present invention relates to telecommunications switching and, more specifically, to a method and system for optimizing the usage of telecommunications switch resources.

2. Description of the Related Art

Current telecommunications network systems do not distinguish between valid and invalid calls, e.g., calls with proper or improper destination codes. Consequently, telecommunications traffic from one carrier network to another is sent indiscriminately to each other and a carrier must rely on its switches to terminate valid phone calls and to reject invalid phone calls. Such traffic can impose a tremendous load on a telecommunications switch and other switch resources, which could ultimately fail from overstress or operate at reduced capacity due to congestion.

This problem becomes more acute in the telecommunications trading environment where multiple carriers are transmitting traffic to each other contemporaneously through a central switch node operated by the trading exchange. The central switch node, regardless of whether the calls are invalid or invalid, could become significantly degraded and prohibit phone calls from terminating, thereby resulting in loss of revenue opportunities for the trading exchange and its member carriers.

SUMMARY OF THE INVENTION

An object of the present invention is to provide a method and system for optimally managing the usage of telecommunications network resources.

Another object of the present invention is to provide a method and a system for screening undesirable telecommunications traffic prior to the switching of telecommunications traffic.

Another object of the present invention is to provide a telecommunications service provider a means to accept or reject telecommunications traffic from a carrier prior to the processing of the traffic.

According to an aspect of the invention, the system provides an operator of a telecommunications trading exchange a method and system for managing far-end capacity based on statistical information on available far-end network capacity.

According to another aspect of the invention, there is provided an optimal method for processing telecommunications traffic based on matched buy and sell orders in a telecommunications trading environment.

In a carrier-to-carrier environment, a carrier may desire to screen out invalid calls, e.g. calls with invalid Initial Address Messages, or to prevent the transmission of traffic to a far-end provider having inadequate capacity so as to decrease the load on the switch. The present invention provides a screening mechanism that may be based on historical data such as invalid calling codes or unique messages collected from the far-end providers' call termination system. In a telecommunications trading environment, the trading exchange operator may employ the inventive call screening mechanism to significantly increase the processing efficiency of its telecommunications switch by rejecting traffic to carriers with inadequate far-end capacity or carriers without any matched buy orders.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
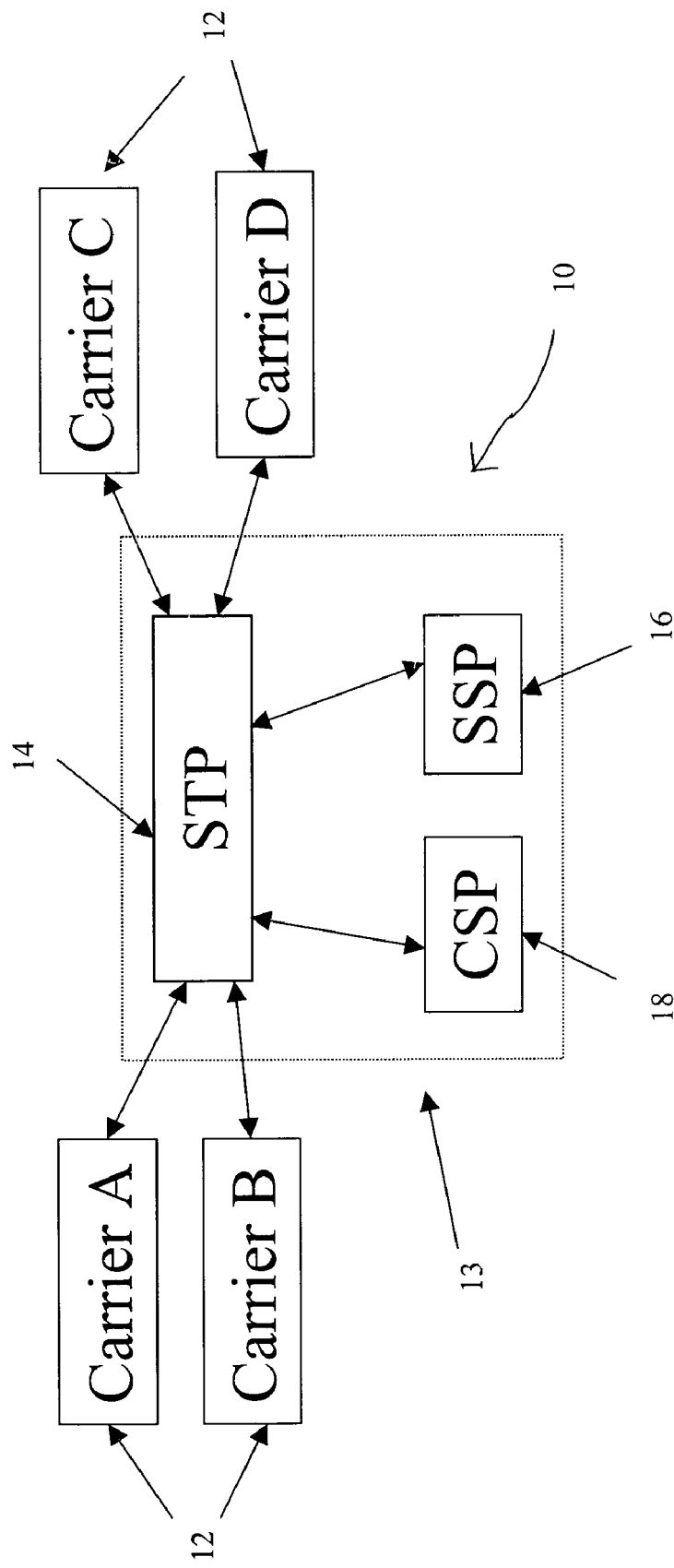
FIG. 1 is a block diagram depicting an embodiment of the present invention employed in a carrier-to-carrier environment.

FIG. 1 diagrammatically illustrates a network 10 comprising a plurality of remote carriers 12 connected to a host carrier 13 that employs a feedback control system for controlling telecommunications traffic to a far-end provider in a carrier-to-carrier environment. In this embodiment, the host carrier utilizing the feedback control system includes a Signal Transfer Point (STP) 14, a Signal Switching Point (SSP) 16, and a Call Screening Processor (CSP) 18.

Each remote carrier 12 connects its network(s) to the STP 14 of the host carrier via either time division multiplexing (TDM) or voice over Internet protocol (VoIP) or other generally accepted telecommunications protocols. A TDM carrier's switch has a unique signaling point code, which is used to identify the carrier's switch on the SS7 network. For each DS0 in the carrier's trunk group there is a circuit identification code (i.e., Circuit ID Code (CIC)), which identifies a specific circuit among all the circuits shared between adjacent signaling points. The combination of the unique signaling point code and the circuit identification code are used between adjacent signaling points to coordinate processing of a particular call. VoIP carriers may be aggregated into common or shared trunk groups and a VoIP carrier's unique identifier is prefixed to the dialed number for downstream identification and/or billing settlement purposes. All calls are initiated when the remote carrier's SSP 16 sends an SS7 message via signaling links to the host carrier's STP 14. The call is then determined to be either valid or invalid based on user-defined business rules and SS7 messages as described below. If a call is valid, the SS7 messages associated with the call are transmitted via signaling links from the STP 14 to the terminating carrier. If a call is invalid, then a release message (REL) is returned to the originating carrier and the associated call is released back to the originating carrier.

The STP 14 acts as a gateway for controlling traffic to and from the various carriers. Preferably, it includes a feature that redirects SS7 messages, including incoming Initial Address Messages (IAMs) to the CSP 18 for call screening. The IAM comprises trunk circuit ID code (TCIC), origination point code (OPC), destination point code (DPC), calling party number, and called party number (directory number). The STP 14 also receives RELs and/or other related messages from distant SSPs operated by the remote carriers. These messages are also redirected to the CSP 18, as described below, for analyzing far-end capacity and remote carrier call termination ability characteristics. The CSP 18 and STP 14 may be connected using a transport adapter layer interface (TALI) or signaling transport (SIGTRAN) interface. TALI and SIGTRAN are SS7 over IP protocols that can be used to interconnect any SS7 system via IP protocol using a standard high-speed network interface such as Ethernet.

The SSP 16 connects remote carrier networks to the host carrier network by establishing communication links with distant SSPs 16 of the remote carrier networks. Each remote carrier's connection to the SSP 16, either via TDM or VoIP circuit, is assigned specific trunk group(s) for each destination point code (DPC). The SSP 16 serves as a feedback sensor for the CSP 18 by collecting information relating to terminating carriers' capacity status (or far-end capacity) via, for example, call completion and call failure messages.

The CSP 18 serves as a feedback controller for the host carrier. It provides intelligent, heuristic processing of all incoming calls to the host carrier SSP 16. Its primary role is to optimize the switch performance so that available network resources (e.g., central processing unit capacity, CDR record writing capability and busy hour call attempt capacity) and far-end capacities are optimally utilized. When the STP 14 redirects SS7 messages to the CSP 18, all incoming calls are analyzed by the CSP 18 based on user-defined criteria or rules. For example, the CSP 18 may determine whether incoming calls are invalid by analyzing the called party number digit length and comparing with a predefined range of maximum and/or minimum value (e.g. by comparing the called party number digit length with the user-defined minimum/maximum digit length such that when a discrepancy is found, the incoming call is released back to the originating network). Optionally, the CSP 18 may also apply heuristic results that are based on statistics collected from REL messages and/or other SS7 messages from distant SSPs. A database of all such collected messages is analyzed by CSP 18 to determine what far-end capacities are available and the reasons for non-termination. For each unique route, a statistically adaptive rule can be generated by the CSP 18 based on this database in order to optimize switch resources. This statistically adaptive rule(s) can be based on one or more parameters such as, for example, remote carrier characteristics, country, city, time, region, special one-time global or local events, number of call attempts, number of call completions, the volume of minutes terminated for specific trunk group, the ratio of these parameters (e.g., call completions to call attempts) and other variables that would affect the optimization of telecommunications switch resources.

Functionally, the CSP 18 may, for example, screen or filter all incoming calls so that unmatched calls do not terminate into the host carrier's SSP 16. Alternatively, the CSP 18 may block or throttle incoming calls based on actual REL message statistics or other feedback messages gathered from each remote carrier trunk group. This throttling of incoming calls is preferably based on SS7 messages received from remote carriers, which messages relate to dialed numbers, country codes, city codes and origination point codes (e.g., zones and sub-zones). Based on statistical history of a remote carrier traffic and corresponding decision or business rules applied by the CSP 18, incoming calls can be enabled or disabled by the CSP 18 for a specific time duration. As another example, the CSP 18 may also measure attempts to or from remote carriers 12 for each destination to determine the percentage of calls being completed through a telecommunications switch to a particular destination. The CSP 18 may apply a statistically adaptive call gap on these particular destinations by sending a REL message back to the originating carrier based on the percentage of calls actually being completed. The CSP 18 will continue monitoring this feedback control mechanism (e.g., monitoring statistical history of remote carrier traffic) to determine if more stringent or less stringent gapping is required. In all cases, a reports viewer may provide intelligent information to network operations center or trading personnel to perform manual or automatic overrides.

In a presently preferred embodiment, the CSP 18 measures call attempts, call completions, and call failures (which may be used to impute certain network failure modes) relative to certain user-defined parameters such as, for example, configurable time of day time bands, configurable day of weeks, configurable call failure types over an interval and on a per-user basis, configurable geographic region (e.g. destination zones and sub-zones) and configurable call cost basis. These measured and user-defined parameters, in whole or in part, may be used to determine the optimal call attempt profile for the remote carrier networks. Through the use of a technique called "call gapping," the user may construct an optimal call attempt profile by assigning appropriate weights to the measured parameters for a particular set of user-defined parameters. The call attempt profile may be varied in a number of ways. For example, volume call gapping may be used to throttle the volume of call attempts by limiting the total number of call attempts over a predetermined period, T. Percentage gapping may also be used to control the flow of call attempts by permitting a percentage of call attempts to be passed to the host carrier switch over a predetermined period based on the ratio of call completions to call attempts over the last interval. A recurring call gapping method may, for example, be used to reject known incomplete calls (e.g. calls which have been rejected by one or more terminating carriers over a predetermined period). Preferably, the call attempt profile may be reconstituted as quickly as possible in response to network changes or outages, while providing a stable function that does not result in wild swings in a call attempt profile presented to the remote carrier networks.

Figure 2:
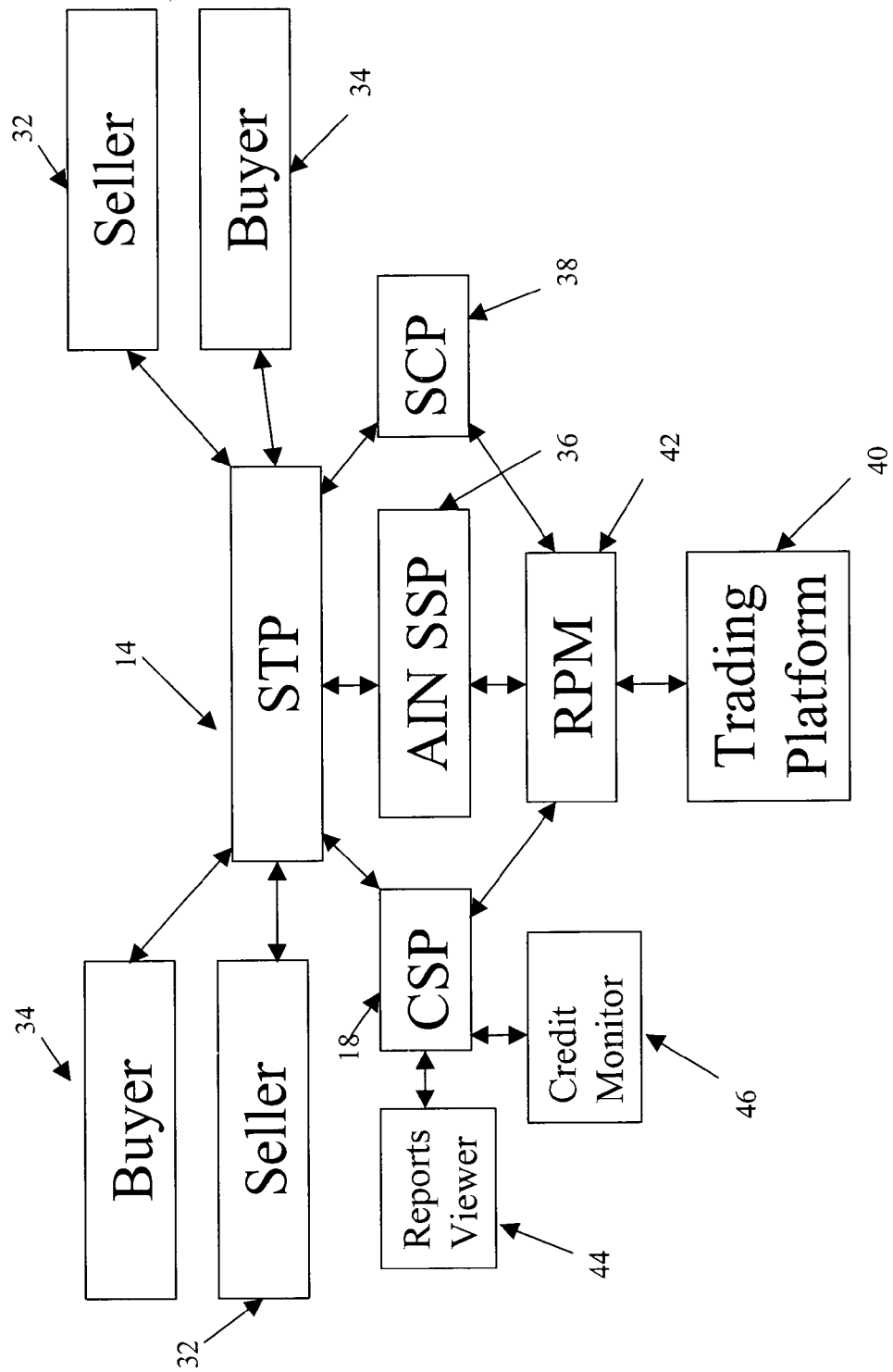
FIG. 2 is a block diagram of an embodiment employed in a trading environment using a Call Screening Processor.

FIG. 2 diagrammatically illustrates an embodiment of the feedback controller system employed in a telecommunications trading environment or exchange 30, wherein buyers 32 and sellers 34 trade telecommunications capacity with each other. In this embodiment, the telecommunications trading operator operates an Advanced Intelligent Network type SSP (AIN SSP) 36, a Signal Control Point (SCP) 38, CSP 18, and an online trading platform 38 for receiving asks and bids for particular routes (or geographic zones or destinations).

The SCP 38 provides, among others, a routing database function for all incoming calls to the trading exchange. It contains a table of routing numbers for all incoming origination point codes and directory numbers, and outputs corresponding destination point codes for the trading exchange's SSPs to translate to the correct trunk group(s). From the route plan management (RPM) 42, the SCP 38 receives route table updates, corresponding OPC and dialed number (DN) to a specific DPC, and computes a routing table based on trading results.

The trading platform 40 matches buy and sell orders (or bids and asks) based on destination, price and other user-specified parameters including, for example, far-end capacities and quality indicia such as Answer Seizure Ratio, Average Call Duration, and permitted variance posted in the bids and asks submitted by the buying and selling carriers 32, 34. The far-end capacities of other trading carriers derived from the received SS7 messages (e.g. call completion/call attempt ratios) may be made accessible to the trading carriers through a website or other electronic media. The matched orders are then forwarded to a Route Plan Management (RPM) 40, which generates route plans based on the matched orders at regular intervals. A route plan typically comprises a buyer matched to an ordered list of sellers such that telecommunications traffic from the buyer would be transmitted first to a seller on top of the list ("first seller") and traffic released by that first seller would be routed to the second seller on the list and so on. Alternatively, the RPM 40 may perform three functions at regular intervals, e.g., every four hours or six times a day: 1) Match buy and sell orders based on price and measured or specified quality, e.g. answer seizure ratio (ASR), and other trading performance parameters. A buyer's order could be matched based on a seller's far-end capacity or ratio, which may be established using results determined by the CSP 18. The results may be based on, for example, REL messages on all matched call attempts sent to the qualifying seller's trunk group; 2) Generate a new route plan for the SCP 38 to use in the case of an AIN SSP 36 or for an IN SSP to use in the case of an IN network; and 3) Compare a new route plan with the existing route plan for activation on the switch. The route plan may be input into the SCP 38 or IN SSP at a predefined interval. However, based on results from the CSP 18, exclusions to the route plan can be generated and activated on a near real-time basis and stored in the SCP 38 using the present inventive method and system. It is contemplated these functions can be performed by other functional modules.

In the telecommunications trading environment, a buyer may send both matched and unmatched traffic to the telecommunications trading operator's network, as it may not know which of its orders have recently been matched by the latest route plan generation. Advantageously, the RPM 42 communicates the matched orders to the CSP 18. Using this information and, optionally, the methods described in connection with the embodiment of FIG. 1, the CSP 18 can determine which telephone calls from a buying carrier should be rejected or released back to the sender (i.e., originating member carrier). The CSP 18 communicates its determination to the STP 14, which in turn transmits RELs to the sender of the rejected calls. It is contemplated that the SCP 38 may incorporate functions of the CSP 18.

Preferably the CSP 18 is connected to a Reports Viewer 44 for enabling users such as network operations and trading personnel to view information regarding trading traffic patterns, real time or otherwise. This information may be used to manage traffic through the trading exchange and can be especially useful to identify destinations where more far end capacity is required to meet demand or where buyers are sending erroneous calling numbers, and to identify sellers which are terminating fewer than all calls offered by their correspondingly matched buyers (a behavior known as "cherry-picking" in the telecommunications industry). For example, selective information, where additional distant end capacity is desired or available, can be provided to member carriers periodically and automatically through an online trading platform.

The trading operator may monitor a carrier's trading account balances and trading activity 7 days a week, 24 hours a day using a credit monitoring module 46. The net balance of these accounts and activity is automatically compared to an established credit line. The credit monitoring module 46 may send e-mail alerts or other notices to the trading carriers periodically to provide information about their remaining credit. These alerts may be provided at predefined percentage thresholds. When a trading carrier's net buying activity in a settlement period reaches a predetermined percentage (e.g., 100%) of its pre-approved credit line the trading carrier will receive a final e-mail alert stating that the trading carrier will be (or has been) blocked from buying on the exchange. However, this trading carrier may still be allowed to sell. When payment is received or the net trading activity brings the trading carrier's balance below a predefined percentage of its credit line, the trading carrier will again be able to buy on the exchange. The credit monitor module 46 will alert the CSP 18 to enable or disable the trading carrier's participation on the exchange, or throttle to a specific setting defined by the trading exchange's trading personnel. This throttling mechanism can be set manually or automatically based on a trading carrier's pre-established credit line.

Figure 3:
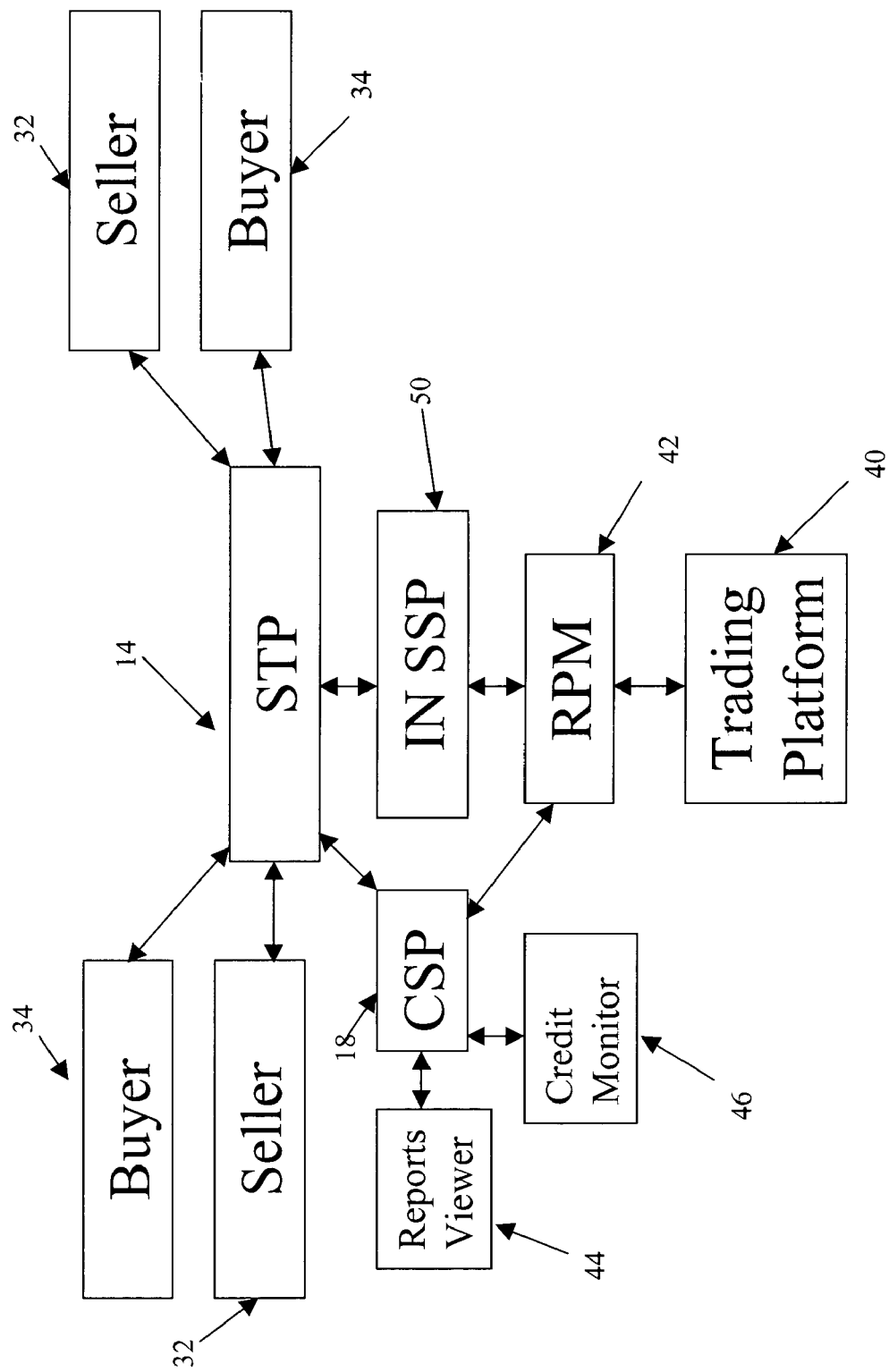
FIG. 3 is a block diagram depicting another embodiment employed in a trading environment.

FIG. 3 illustrates a variation of the embodiment of FIG. 2. In this embodiment, the SSP is of the Intelligent Network type (IN SSP) 50 which does not communicate with a SCP but includes functions that are substantially similar to the SCP 38 described above. Nonetheless, the CSP 18 may determine, as described above, the validity of incoming calls based on the matched or unmatched orders from the RPM 42 and/or feedback messages received from distant SSPs of the trading carriers for the purpose of managing far-end capacities of the trading carriers.

Thus, while fundamental novel features of the invention as applied to preferred embodiments have been described, it will be understood that various omissions, substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A call screening system for use in a telecommunications trading environment, comprising:
   a. a node for matching buyers and sellers of telecommunications services based on buy and sell orders for said telecommunications services, said node being in signaling communication with networks of the buyers and sellers and processing signaling messages between buyers and sellers relating to status of transmitted telephone calls; and
   b. a screening processor for screening telephone calls originating from the buyers based on said signaling messages such that telephone calls that are not associated with the matched buy orders are released back to corresponding buyers' networks.

2. The call screening system of claim 1, wherein said node includes a trading platform for receiving buy and sell orders of telecommunications traffic.

3. The call screening system of claim 2, wherein said node includes a route plan management module, connected to said trading platform, for matching the received buy and sell orders and generating a route plan.

4. The call screening system of claim 3, wherein said node further includes a signal transfer point, connected to said route plan management module, for receiving the route plan and controlling telecommunications traffic between said buyers' and sellers' networks.

5. The call screening system of claim 4, wherein said node further includes a signal switching point, connected to said signal transfer point, for switching telecommunications traffic between said matched buyers' and sellers' networks.

6. The call screening system of claim 5, wherein said screening processor is configured to analyze said signaling messages from said sellers' networks to determine far-end capacities of said sellers' networks.

7. The call screening system of claim 6, wherein said signaling messages are SS7 based messages.

8. The call screening system of claim 6, wherein said screening processor controls the flow of telecommunications traffic by limiting the number of call attempts to said signal switching point.

9. A method of screening telecommunications traffic in a telecommunications environment, comprising the steps of:
 a. receiving buy and sell orders for telecommunications services from buyers and sellers;
 b. matching buyers and sellers of telecommunications services based on the buy and sell orders for said telecommunications services;
 c. processing signaling messages between buyers and sellers relating to status of transmitted telephone calls; and
 d. screening telephone calls originating from the buyers based on said signaling messages such that telephone calls that are not associated with the matched buy orders are released back to corresponding originating buyers networks.

10. The call screening method of claim 9, wherein said signaling messages include at least one of call completion and call failure messages.

11. The call screening method of claim 10, further comprising the step of controlling the flow of telecommunications traffic from matched buyers' networks which includes analyzing signaling messages received from sellers' networks.

12. The call screening method of claim 11, wherein said step of controlling the flow of telecommunications traffic includes the step of limiting the number of call attempts forwarded to a seller network.

13. The call screening method of claim 11, wherein said step of controlling the flow of telecommunications traffic comprises the step of releasing calls which have been rejected repeatedly by one or more matched sellers.

14. A call screening system for use in a carrier-to-carrier environment, comprising:
 a. a host carrier node for receiving and transmitting from a first carrier telephone calls to a second carrier, said host carrier node being in signaling communication with said first and second carriers and processing signaling messages from said second carrier relating to status of transmitted telephone calls; and
 b. a screening processor for screening telephone calls originating from said first carrier based on said signaling messages, said screening processor configured such that at least one of unmatched ones of said incoming calls do not terminate into said host carrier node and incoming calls are blocked or throttled based on feedback messages gathered from remote carrier trunk groups.

15. The call screening system of claim 14, wherein said node further includes a signal transfer point for controlling telecommunications traffic between said first and second carries.

16. The call screening system of claim 15, wherein said node further includes a signal switching point, connected to said signal transfer point, for switching telecommunications traffic between said first and second carriers.

17. The call screening system of claim 16, wherein said screening processor is configured to analyze said signaling messages from said second carrier to determine far-end capacities of said second carrier.

18. The call screening system of claim 17, wherein said screening processor controls the flow of telecommunications traffic by limiting the number of call attempts to said signal switching point.

19. The call screening system of claim 17, wherein said screening processor controls the flow of telecommunications traffic by releasing calls which have been rejected repeatedly by said second carrier.

20. A method of call screening in a carrier-to-carrier environment, comprising the steps of:
 a. processing signaling messages to and from a first carrier and a second carrier relating to status of transmitted telephone calls; and
 b. screening telephone calls originating from said first carrier based on said signaling messages, said step of screening comprising at least one of preventing unmatched ones of said incoming calls from terminating into a host carrier node of the second carrier and blocking or throttling incoming calls based on feedback messages gathered from remote carrier trunk groups.

21. The call screening method of claim 20, wherein said signaling messages include at least one of call completion and call failure messages.

22. The call screening method of claim 21, further comprising the step of controlling the flow of telecommunications traffic by analyzing the signaling messages received from said second carrier.

23. The call screening method of claim 22, wherein said step of controlling the flow of telecommunications traffic includes the step of limiting the number of call attempts forwarded to said second carrier.

24. The call screening method of claim 23, wherein said step of controlling the flow of telecommunications traffic comprises the step of releasing calls which have been rejected repeatedly by said second carrier.

\* \* \* \* \*